United States Patent
Perahia et al.

(10) Patent No.: US 12,253,612 B2
(45) Date of Patent: Mar. 18, 2025

(54) LOCATION DETECTION WITH GNSS AND DEVICE RANGE MEASUREMENTS

(71) Applicant: HEWLETT PACKARD ENTERPRISE DEVELOPMENT LP, Houston, TX (US)

(72) Inventors: Eldad Perahia, Park City, UT (US); Vikram Raghu, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 556 days.

(21) Appl. No.: 17/513,552

(22) Filed: Oct. 28, 2021

(65) Prior Publication Data
US 2023/0136500 A1    May 4, 2023

(51) Int. Cl.
*G01S 19/42* (2010.01)
*G01S 19/46* (2010.01)

(52) U.S. Cl.
CPC .......... *G01S 19/426* (2013.01); *G01S 19/423* (2013.01); *G01S 19/46* (2013.01)

(58) Field of Classification Search
CPC ...... G01S 13/765; G01S 19/40; G01S 19/423; G01S 19/426; G01S 19/46; G01S 19/48; G01S 19/50
See application file for complete search history.

(56) References Cited

U.S. PATENT DOCUMENTS

| | | |
|---|---|---|
| 5,828,336 A | 10/1998 | Yunck et al. |
| 6,243,648 B1 | 1/2001 | Kilfeather et al. |
| 6,445,927 B1 | 3/2002 | King et al. |
| 6,502,033 B1 | 12/2002 | Phuyal |
| 8,046,169 B2 | 10/2011 | Mazlum et al. |
| 9,261,599 B1 | 2/2016 | Golden et al. |
| 2008/0082254 A1 | 4/2008 | Huhtala et al. |
| 2009/0177382 A1 | 7/2009 | Alles et al. |
| 2015/0369924 A1 | 12/2015 | Hedgecock et al. |

FOREIGN PATENT DOCUMENTS

WO    WO-20190162877    8/2019

*Primary Examiner* — Nader Bolourchi
(74) *Attorney, Agent, or Firm* — Sheppard Mullin Richter & Hampton LLP

(57) ABSTRACT

Systems and methods are provided for improving geolocation services, like GPS, using network device measurements. For example, a plurality of access points (APs) or other network devices may be implemented in a network environment and constructed with a GPS chip. Range measurements can be collected from these network devices and incorporated with the GPS locations using various methods described herein to improve the overall location determination of these devices.

20 Claims, 9 Drawing Sheets

LOCATION DETECTION WITH GNSS AND DEVICE RANGE MEASUREMENTS

BACKGROUND

A Global Positioning System (GPS) is one of the global navigation satellite systems (GNSS) that provides geolocation and time information to a GPS receiver. The geolocation and time information requires an unobstructed line of sight between the GPS receiver and four or more GPS satellites. However, GPS signals are relatively weak and can be easily obstructed by geological features (e.g., mountains) or man-made features (e.g., buildings).

BRIEF DESCRIPTION OF THE DRAWINGS

The present disclosure, in accordance with one or more various examples, is described in detail with reference to the following figures. The figures are provided for purposes of illustration only and merely depict typical examples.

The figures are not exhaustive and do not limit the present disclosure to the precise form disclosed.

DETAILED DESCRIPTION

Examples of the application improve geolocation services, like GPS, using network device measurements. For example, a set of access points (APs) or other network devices (e.g., that are constructed with a GPS chip) may be implemented in a network environment. Range measurements can be collected from these network devices and incorporated with the coordinates (e.g., determined from GPS) using various methods described herein to improve the overall location determination of these devices. The range measurements between the APs or other network devices may help improve the determined locations of these network devices, even when the quality of the wireless transmission signals are degraded.

Figure 1:
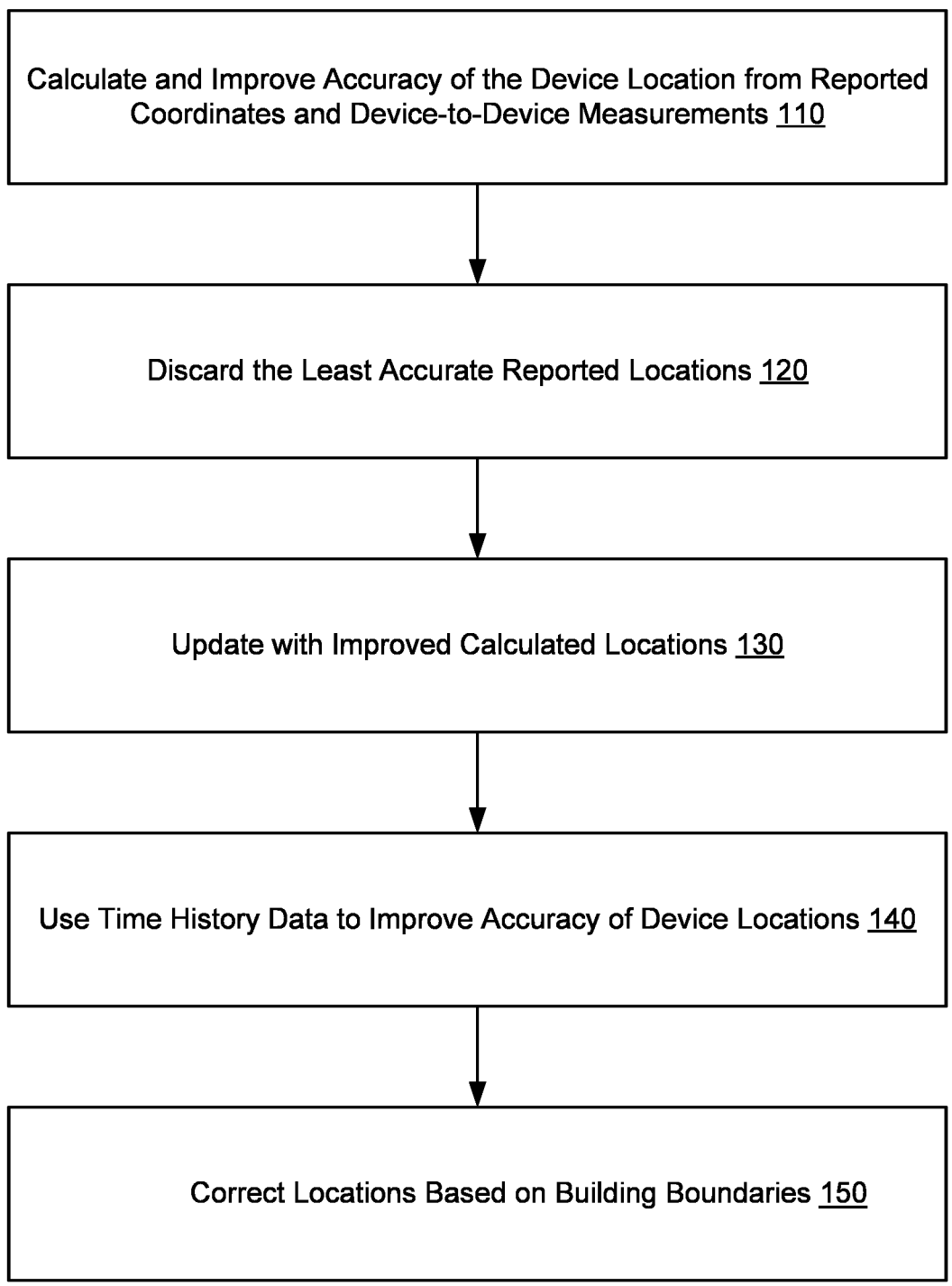
FIG. 1 illustrates a location detection process, in accordance with some examples of the application.

FIG. 1 provides an illustrative process of improving location determination of network devices, in accordance with some examples of the application. Other illustrative examples of this process are provided throughout the disclosure using a plurality of access points (e.g., AP-to-AP range measurements), although any network device with a GPS chip may be implemented using the disclosure provided herein.

The process can include one or more of the following steps, including (1) calculating and improving accuracy of device location from reported coordinates (e.g., using Earth as a frame of reference, or selected from a set of latitude, longitude, altitude, Cartesian x, y, or z values, polar coordinates, etc.) and device-to-device measurements at 110, (2) discarding a least accurate (i.e. worst) reported coordinates at 120, (3) updating with improved calculated locations at 130, (4) using GNSS time history data to improve accuracy of device location at 140, and (5) correcting locations based on a geographical boundary representation of the environment surrounding the devices at 150. At each step of the process, the mean error of the calculated locations may be reduced. Any one or more of these processes may help improve the location detection of the network devices.

At block 110, the process may calculate and improve the accuracy of device location from reported coordinates (e.g., using Earth as a frame of reference, or selected from a set of latitude, longitude, altitude, Cartesian x, y, or z values, polar coordinates, etc.) and device-to-device measurements. For example, the distances calculated from a set of reported coordinates for the devices ($x_i$, $y_i$) are adjusted to match the device-to-device range measurements. The devices themselves may provide the reported coordinates based on coordinates reported by a GPS chip in each device.

The reported coordinates of the device may be reported over a predetermined time period (e.g., 24 hours). This can yield a set of non-linear equations representing Euclidean distances between the adjusted coordinates. The non-linear equations can include unknown values ($\Delta x_i$, $\Delta y_i$) for each device. The unknown values can represent the adjustment needed to match the distances derived from the reported coordinates with the distances obtained from the device-to-device range measurements. Thus, for N-number of devices, there may be 2*N unknown values (i.e., N*($\Delta x_i$, $\Delta y_i$) pairs). To solve the 2*N unknown values, the process may choose multiple equations to solve for the 2*N unknown values, as described throughout the disclosure.

In some examples, block 110 may further include converting the non-linear equations to linear equations. The conversion process may use a Taylor series expansion (e.g., an infinite sum of terms that are expressed in terms of the function's derivatives at a single point). The converted, linear equations may be represented in matrix form to solve for the unknown ($\Delta x_i$, $\Delta y_i$) pairs. Block 110 may be repeated until the values converge (e.g., as an iterative step).

These processes and values can result in improved accuracy of the determined locations. For example, the distances obtained from the device-to-device range measurements can identify an approximate distance between two devices, corresponding with a circumference of possible locations around each device. When the range measurement information is combined with the reported coordinates, the process can narrow down the possible locations that each device may be located to help quality check the reported coordinates from the GNSS.

At block 120, the improved calculated locations obtained from performing block 110 may be compared with the set of reported coordinates from each of the network devices. The reported coordinates with the largest deviation between the processed and original coordinates may be discarded (e.g., the least accurate or "worst" GNSS/GPS locations). In some examples, a minimum number of devices may be needed to solve the system of equations at block 110 (e.g., five devices). Block 110 may be repeated on the remaining devices.

The least accurate or "worst" GNSS/GPS locations may be determined by a ranking or sorting of the device locations. For example, the distance between the location determined by block 110 and the reported location may be compared. In another example, the adjustment corresponding with the ($x_i$, $y_i$) values are identified and ranked. The device with the greatest change between the reported location and the location determined by block 110 may be identified and discarded.

By discarding the outlier cases (e.g., the largest difference between the improved calculated locations and the reported coordinates), the process may further improve the determined locations of each device from block 110. For example, the reported coordinates from the GNSS may be highly incorrect and any incremental corrections to the reported coordinates may slightly improve the determination of the actual location of the device. In this instance, the process may implement a more straight-forward process of finding the location of the device, like only relying on device-to-device range measurements or determining a location of the device through other means.

At block 130, the process may update the locations with improved locations. For example, the process may generally repeat block 110 but replace the set of reported coordinates with the improved calculated locations from block 120. The updating process performed at block 130 may select devices in an order starting with the largest deviation between the set of reported coordinates and the improved calculated locations from block 120. The next device may be chosen in decreasing order of magnitude of deviation between set of reported coordinates and the improved calculated locations.

At block 140, the process may replace the instantaneous reported coordinates of the device (e.g., the reported coordinates from GNSS) with time averaging of reported coordinates of the device (e.g., which represents an average over a predetermined time period, like 24-hours). The processing performed with block 140 may be similar to block 110, but using averaged coordinates over a time period rather than instantaneous reported coordinates.

The instantaneous reported coordinates of the device may be based on the predetermined time period (e.g. 30 min). During this step, block 140 may repeat the process of block 110 a final time by replacing the set of reported coordinates (e.g., coordinates at a single point of time) with the best averaged value of the reported coordinates of the device (i.e., the "best" averaged coordinates may result in the smallest deviation between the instantaneous reported coordinates of the device and the improved calculated location for the device).

In some examples, block 140 may be performed on the device having the largest deviation between the improved calculated location after blocks 120 or 130 and the set of reported coordinates from block 110. In some examples, block 140 may be skipped for devices with a deviation between the improved calculated location after blocks 120 or 130 and the set of reported coordinates from block 110 being less than a threshold value (e.g., less than five meters difference). Block 140 may be performed for each other device in decreasing order of the deviation.

At block 150, the process may correct locations based on boundary information associated with a geographical representation of a structure containing the devices. For example, if a floor map or other geographical representation of an area or structure containing the devices in the environment is available, boundary information may be used to further reduce the error between the improved calculated locations of devices and the true spatial locations of the devices. For example, the building boundary may be identified and any location outside the building boundary on the floor map may be moved to a nearest location within the building boundary. In other examples, the location may be removed.

Illustrative examples of blocks 110-150 are provided throughout the disclosure, including in a sample structure with illustrative network devices. The illustrations also provide sample corrections to the error average of all network device locations determined by the process when compared to the reported coordinates from the GNSS/GPS.

Technical improvements are realized throughout the disclosure. For example, the process can provide multiple methods for improving the determination of the location of various devices in various environments, creating better location accuracy of devices within a structure and improved data throughout the system. This further improves GNSS/GPS overall.

Figure 2:
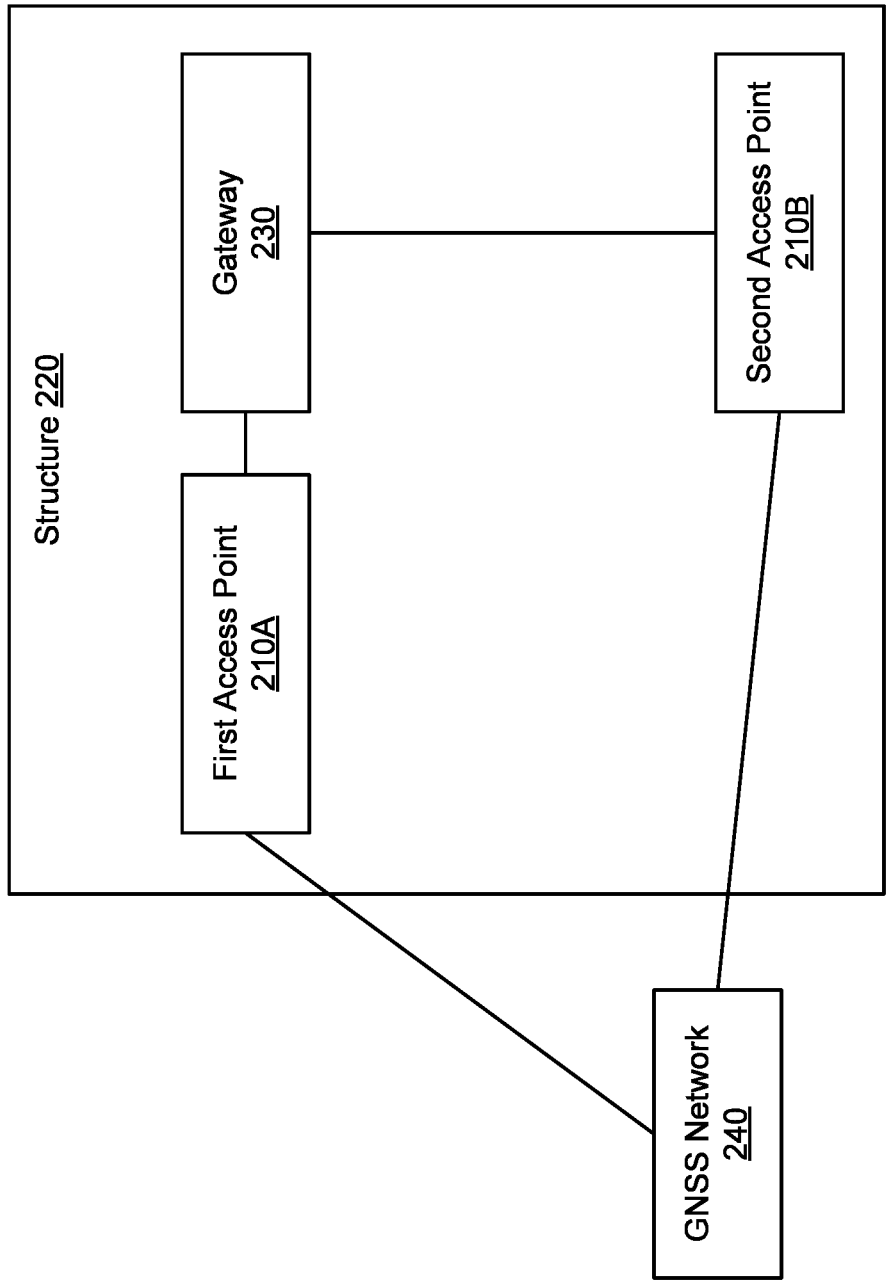
FIG. 2 illustrates locations of a plurality of devices in association with a structure, in accordance with some examples of the application.

The device-to-device (e.g., AP-to-AP or gateway-to-gateway) range measurement process illustrated in FIG. 1 can be implemented using the structure and devices illustrated with FIG. 2. For example, FIG. 2 illustrates locations of a plurality of devices in association with a structure, in accordance with some examples of the application. In this illustration, the devices may comprise a plurality of access points 210 (illustrated as first access point 210A and second access point 210B), structure 220, gateway 230, and GNSS network 240.

A set of access points (APs) 210 can refer to a network device that allows a wireless-compliant device, such as a client device or station (STA), to connect to a wired network. Thus, an AP essentially functions as an extension mechanism from an existing wired network to a plurality of wireless client devices.

Figure 3:
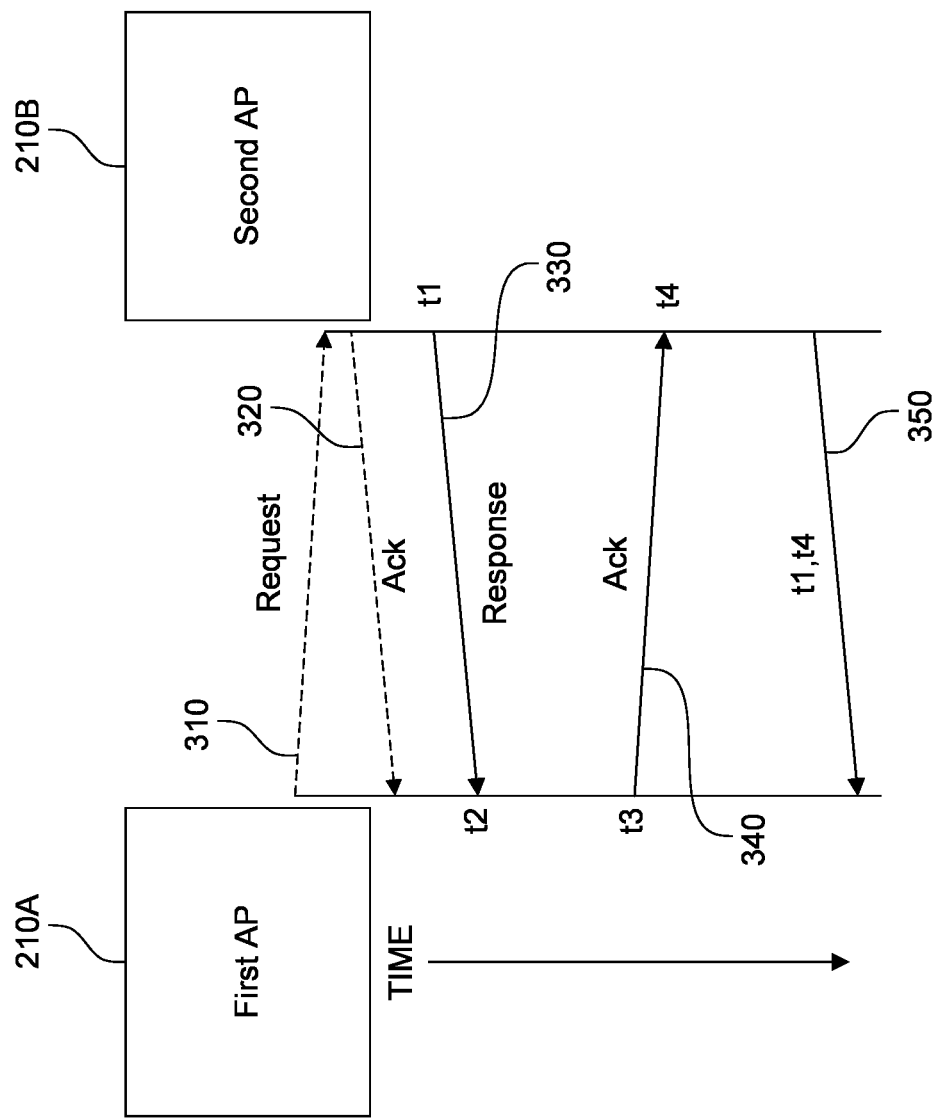
FIG. 3 illustrates a range measurement process, in accordance with some examples of the application.

Access points (APs) 210 can determine a distance between two devices through various methods (e.g., AP-to-AP range measurements or device-to-device range measurement), including the illustrative process provided in FIG. 3. In this example, each AP 210 may comprise an internal clock that is not synchronized to a central clock, so that a one-way time measurement cannot be based on differences between timestamps or clock offsets.

The process may begin with first AP 210A initiating a scan to identify one or more network devices present within structure 220, including second AP 210B. For example, first AP 210A may perform a scan and broadcast/transmit one or more probe packets to listening devices within structure 220 (e.g., in accordance with the IEEE 802.11i or 802.11r protocols). The transmission of the probe packets may help determine whether a different access point, including second AP 210B, can provide a signal. After first AP 210A detects second AP 210B that provides the signal, first AP 210A commences an association process with second AP 210B, as illustrated in FIG. 3.

In some examples, the process may initiate the authentication process between two APs in accordance with the IEEE protocols. In addition to this authentication process, the timestamps included in the probe packets may be repurposed to determine the range measurements between the devices. For example, first AP 210A may transmit a probe packet to second AP 210B. In addition to authenticating the AP on the network, the timestamp that the probe packet was transmitted may be determined (e.g., from the header information in the probe packet) and used to identify a timestamp that the probe packet was sent from first AP 210A to second AP 210B. As such, both authentication and timestamps may be utilized in this process.

As illustrated in FIG. 3, the process may start at 310, first AP 210A transmits a request to second AP 210B.

At 320, second AP 210B transmits an Acknowledgement (Ack) to first AP 210A.

At 330, based on transmitting the Ack, second AP 210B transmits a response to first AP 210A. The response may comprise a timestamp identifying when the response command was issued by second AP 210B.

At 340, first AP 210A may parse the response and identify the timestamp associated with the internal clock at second AP 210B. First AP 210A can compare a current time with the timestamp included in the response. First AP 210A responds to second AP 210B with an Ack.

At 350, the remaining timestamps (e.g., timestamp T1 and timestamp T4) may be transmitted from second AP 210B to first AP 210A.

The four timestamps corresponding with transmissions and receipts may be recorded and stored at one or both APs 210 to determine the range measurement between the devices. The four timestamps may comprise, for example, (1) second AP 210B response transmission, which is illustrated as T1 in FIG. 3, (2) first AP 210A response receipt, which is illustrated as T2 in FIG. 3, (3) first AP 210A acknowledgment transmission, which is illustrated as T3 in FIG. 3, and (4) second AP 210B acknowledgment receipt, which is illustrated as T4 in FIG. 3. First AP 210A can calculate the round-trip time by subtracting the timestamps from second AP 210B and subtracting its own packet turnaround timestamps. The difference between these timestamps may leave the round trip packet time-of-flight, which is multiplied by the speed of light to get distance, and divided by two to get the AP-to-AP range measurement between first AP 210A and second AP 210B.

Returning to FIG. 2, structure 220 may comprise a building with physical barriers or building boundaries that may block or otherwise obstruct wireless transmissions between network devices located internal to structure 220 and devices that are external to structure 220. In some examples, structure 220 may decrease the strength of wireless transmissions to the device, like AP 210, from GNSS network 240. This may cause inaccurate reported coordinates or spatial arrangement for any network devices located within structure 220.

Gateway 230 may provide Dynamic Host Configuration Protocol (DHCP), Network Address Translation (NAT), or routing capabilities for other network devices that are communicatively coupled with gateway 230 (e.g., authenticated or within a threshold distance). In some examples, gateway 230 may further host a Virtual Private Network (VPN) client for providing secure connectivity to a remote data center or other cloud service(s) (e.g., that are located external to structure 220).

GNSS network 240 may include suitable logic, circuitry, interfaces, and/or code that may provide navigation information to land-based devices via satellite links. In this regard, GNSS network 240 may include, for example, the plurality of GNSS satellites each of which is operable to provide satellite transmissions based on a global navigation satellite system (GNSS). Exemplary GNSS systems may include, for example, GPS, GLONASS, Galileo-based satellite system, Beidou, and/or Compass systems. Accordingly, GNSS network 240 may be operable to provide positioning information via downlink satellite links transmitted from one or more of the plurality of GNSS satellites to enable land-based devices, such as APs 210, to determine their locations. The plurality of GNSS satellites may directly provide positioning information to a land-based device, or the land-based device may utilize satellite transmissions from different satellites to determine its location using, for example, triangulation-based techniques.

Using the structure and devices described in FIG. 2, the system may improve location determination of the network devices, like the location of each of APs 210 in FIG. 2.

The first step may correspond with the process described at block 110 in FIG. 1, which can calculate and improve the accuracy of device location from reported coordinates and device-to-device measurements. An illustrative placement of each of access points 210 within structure 220 is provided with FIG. 4.

Figure 4:
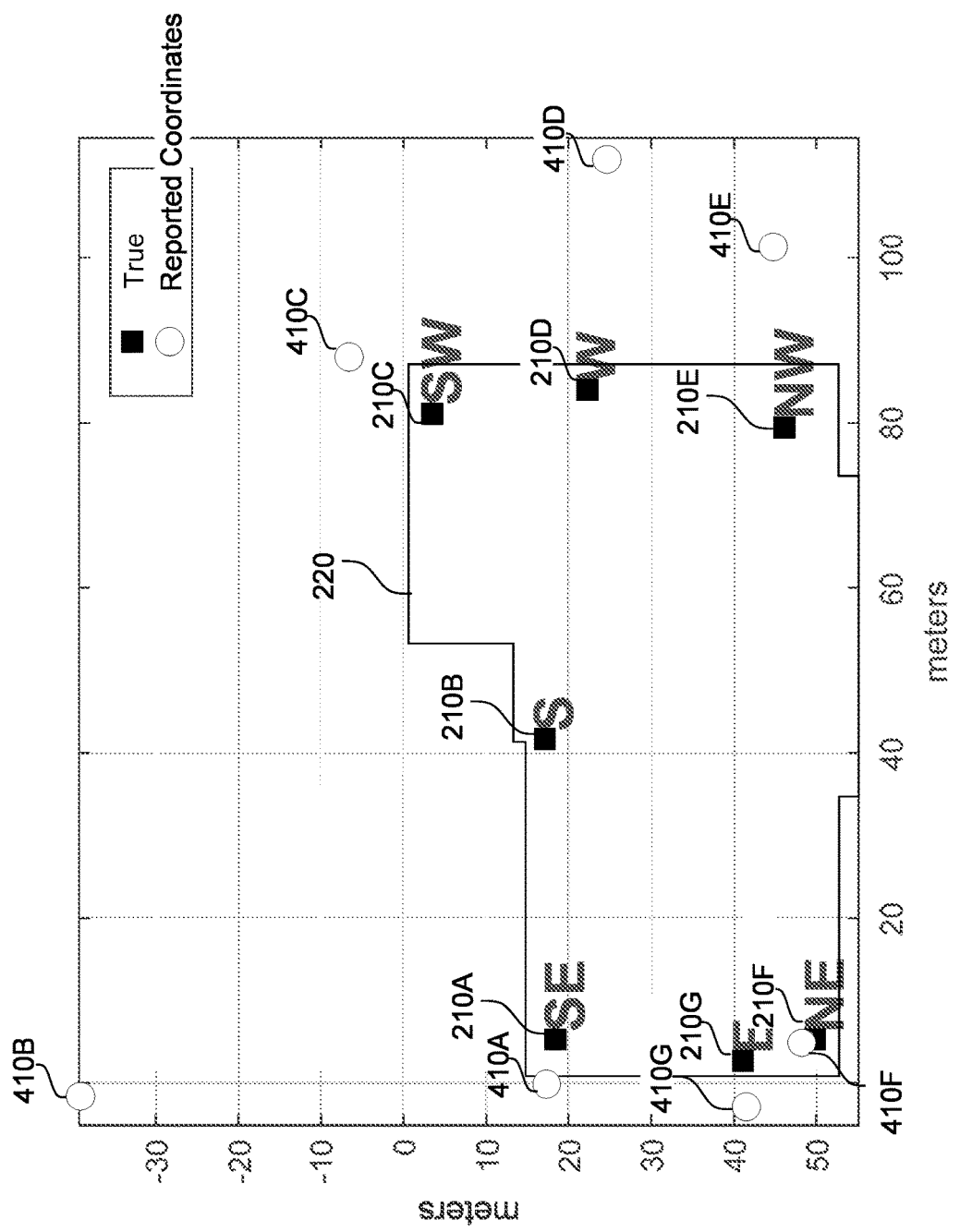
FIG. 4 illustrates true spatial locations and incorrect geolocations of network devices plotted on a floor map, in accordance with some examples of the application.

FIG. 4 illustrates true spatial locations and inaccurate reported coordinates of network devices plotted on a floor map, in accordance with some examples of the application. In this illustration, the true spatial locations of APs 210 are compared to the coordinates reported by the GPS chip in each AP 210 with a time period (e.g., 24 hour range or averaged values). The reported coordinates 410 (illustrated as first reported coordinate 410A, second reported coordinate 410B, third reported coordinate 410C, fourth reported coordinate 410D, fifth reported coordinate 410E, sixth reported coordinate 410F, and seventh reported coordinate 410G) are provided for each of APs, whose actual locations are plotted as APs 210 of FIG. 4 (illustrated as first AP 210A, second AP 210B, third AP 210C, fourth AP 210D, fifth AP 210E, sixth AP 210F, and seventh AP 210G).

As shown in this illustrative example, the distance between reported coordinates 410 and the actual location of each of APs 210 can vary large or small distances within or outside structure 220. One example of a large distance between reported coordinates and actual locations is the AP located at the south-end of structure 220, illustrated as second AP 210B and second reported coordinate 410B. One example of a small distance between reported coordinates and actual locations is the access point located at the north-east end of structure 220, illustrated as sixth AP 210F and sixth reported coordinate 410F. In this example, the aggregated computation of comparing the reported coordinates 410 with the true spatial locations of APs 210 can correspond with approximately 20.8 meters of GNSS/GPS error average over all locations.

Various methods may be used to calculate the differences between reported coordinates 410 with the true spatial locations of APs 210, such that the distances calculated from a set of reported coordinates 410 for APs 210 are adjusted to match the device-to-device range measurements. This can yield a set of non-linear equations representing Euclidean distances between the adjusted locations. For example, the reported coordinates may be stored as coordinates on an X- and Y-axis, including $(x_i, y_i)$. The non-linear equations can include unknown values that compare the reported location with the actual location, or the delta/difference between the two locations $(\Delta x_i, \Delta y_i)$ for each device. The unknown values can represent the adjustment needed to match the device-to-device range measurements (e.g., using the device-to-device range measurements discussed with FIG. 3) and the distances obtained from the reported coordinates (x, y). Because of the GPSS/GPS error, these values may not be equal.

In some examples, the process may generate one or more formulas to determine the difference between the reported and actual values. For example, using the N-number of devices, there may be 2*N unknown values (i.e., N*($\Delta x_i$, $\Delta y_i$) pairs).

$$[(x_1+\Delta x_1)-(x_2+\Delta x_2)]^2+[(y_1+\Delta y_1)-(y_2+\Delta y_2)]^2=D_{12}^2$$

$$[(x_i+\Delta x_i)-(x_j+\Delta x_j)]^2+[(y_i+\Delta y_i)-(y_j+\Delta y_j)]^2=D_{ij}^2$$

To solve the 2*N unknown values, the data correction process may choose multiple equations to solve for the 2*N unknown values. As an illustrative example, the reported coordinates of first AP 210A may correspond with coordinate (x, y) and the adjusted location of first AP 210A may correspond with coordinate (x+$\Delta$x, y+$\Delta$y).

The adjusted location of first AP 210A may be based on the device-to-device range measurement, including the process described with FIG. 2. When the device-to-device range measurement is determined, the device-to-device range measurement ($D_{ij}$) may be equated to the Euclidean distances calculated between the adjusted locations of two AP 210s. The data correction process may solve for ($\Delta$x, $\Delta$y).

In some examples, this step may further include converting the non-linear equations to linear equations. The conversion process may use a Taylor series expansion. For example, the initial set of equations to solve for ($\Delta$x, $\Delta$y) may include:

$$f(x_i,x_j,y_i,y_j)=\{[x_i-x_j]^2+[y_i-y_j]^2\}^{1/2}$$

The converted Taylor series expansion corresponds with the following equation:

$$f(x_i+\Delta x_i, x_j+\Delta x_j, y_i+\Delta y_i, y_j+\Delta y_j) = f(x_i, x_j, y_i, y_j) + \frac{\partial fO}{\partial x_i}\Delta x_i + \frac{\partial fO}{\partial x_j}\Delta x_j + \frac{\partial fO}{\partial y_i}\Delta y_i + \frac{\partial fO}{\partial y_j}\Delta y_j + \text{higher order terms}$$

Which can be simplified by defining the following equation:

$$r_{ij}=\{[x_i-x_j]^2+[y_i-y_j]^2\}^{1/2}$$

Setting the $r_{ij}$ equation equal to the device-to-device range measurements can result in the following linear equation as a function of the delta differences ($\Delta$'s):

$$D_{ij} = r_{ij} + \left(\frac{x_i-x_j}{r_{ij}}\right)\Delta x_i + \left(\frac{x_j-x_i}{r_{ij}}\right)\Delta x_j + \left(\frac{y_i-y_j}{r_{ij}}\right)\Delta y_i + \left(\frac{y_j-y_i}{r_{ij}}\right)\Delta y_j \left(\frac{x_i-x_j}{r_{ij}}\right)$$

$$\Delta x_i + \left(\frac{x_j-x_i}{r_{ij}}\right)\Delta x_j + \left(\frac{y_i-y_j}{r_{ij}}\right)\Delta y_i + \left(\frac{y_j-y_i}{r_{ij}}\right)\Delta y_j = D_{ij} - r_{ij}$$

The converted, linear equations may be represented in matrix form to solve for the unknown ($\Delta x_i$, $\Delta y_i$) pairs (e.g., $\Delta = \Delta^{-1}*b$).

$$\begin{bmatrix} \left(\frac{x_1-x_2}{r_{12}}\right) & \left(\frac{y_1-y_2}{r_{12}}\right) & \left(\frac{x_2-x_1}{r_{12}}\right) & \left(\frac{y_2-y_1}{r_{12}}\right) & \cdots \\ \vdots & \vdots & \vdots & \vdots & \square \\ \square & \square & \square & \square & \square \\ \square & \square & \square & \square & \square \\ \square & \square & \square & \square & \square \end{bmatrix} \begin{bmatrix} \Delta x_1 \\ \Delta y_1 \\ \Delta x_2 \\ \Delta y_2 \\ \vdots \\ \Delta x_N \\ \Delta y_N \end{bmatrix} =$$

$$\begin{bmatrix} D_{12} - r_{12} \\ \vdots \\ D_{ij} - r_{ij} \\ \vdots \\ D_{N-1,N} - r_{N-1,N} \end{bmatrix}$$

In some examples, the processing step of block 110 (illustrated in FIG. 4) may be repeated by iteratively performing the data correction process. The delta/difference values between the reported locations and the determined locations using the device-to-device range measurements ($\Delta$) may be recomputed until the values converge (e.g., iterative step or delta reaches zero).

$$(x_i^{new}=x_i+\Delta x_1, x_j^{new}=x_j+\Delta x_j, y_i^{new}=y_i+\Delta y_i, y_j^{new}=y_j+\Delta y_j)$$

The illustrative examples provided herein are provided as two-dimensional examples for simplicity, as are the subsequent examples discussed herein (e.g. x, y). However, any of the processing steps discussed in the disclosure may be modified to include a third dimension (z), as illustrated by the updated Euclidian distance calculation below.

$$[(x_i+\Delta x_1)-(x_j+\Delta x_j)]^2+[(y_i+\Delta y_i)-(y_j+\Delta y_j)]^2+[(z_i+\Delta z_i)-(z_j+\Delta z_j)]=D_{ij}^2$$

As an illustrative example of incorporating a three-dimensional (3D) data correction process, the network device may be mounted to a ceiling interior to a building structure 220. The ceiling may vary in heights or altitude, causing the z-value of a three-dimensional equation to be altered as well as the x- and y-values. The data correction process may help identify when the latitude and longitude coordinates of the network device should be adjusted for height or altitude as well.

The result of block 110 may determine collaborative coordinates calculation and correction values for each of the devices (e.g., APs 210). In this illustrative example, the corrected geolocations or coordinates of each of the APs may be adjusted, which can also adjust the mean error of the calculated locations. In this example, the mean error may be reduced from approximately 20.8 meters of GPS error average over all locations to 9.7 meters.

At block 120, the improved calculated locations obtained from block 110 may be compared with the set of reported coordinates for a set of network devices (e.g., APs). In this process, the pair of locations with the largest deviation (e.g., between received coordinates and calculated coordinates) may be discarded (e.g., the least accurate or "worst" locations). In some examples, a minimum number of devices may be needed to solve the system of equations in block 110 (e.g., five devices based on 2*N unknown values leaving four anchor devices).

Figure 5:
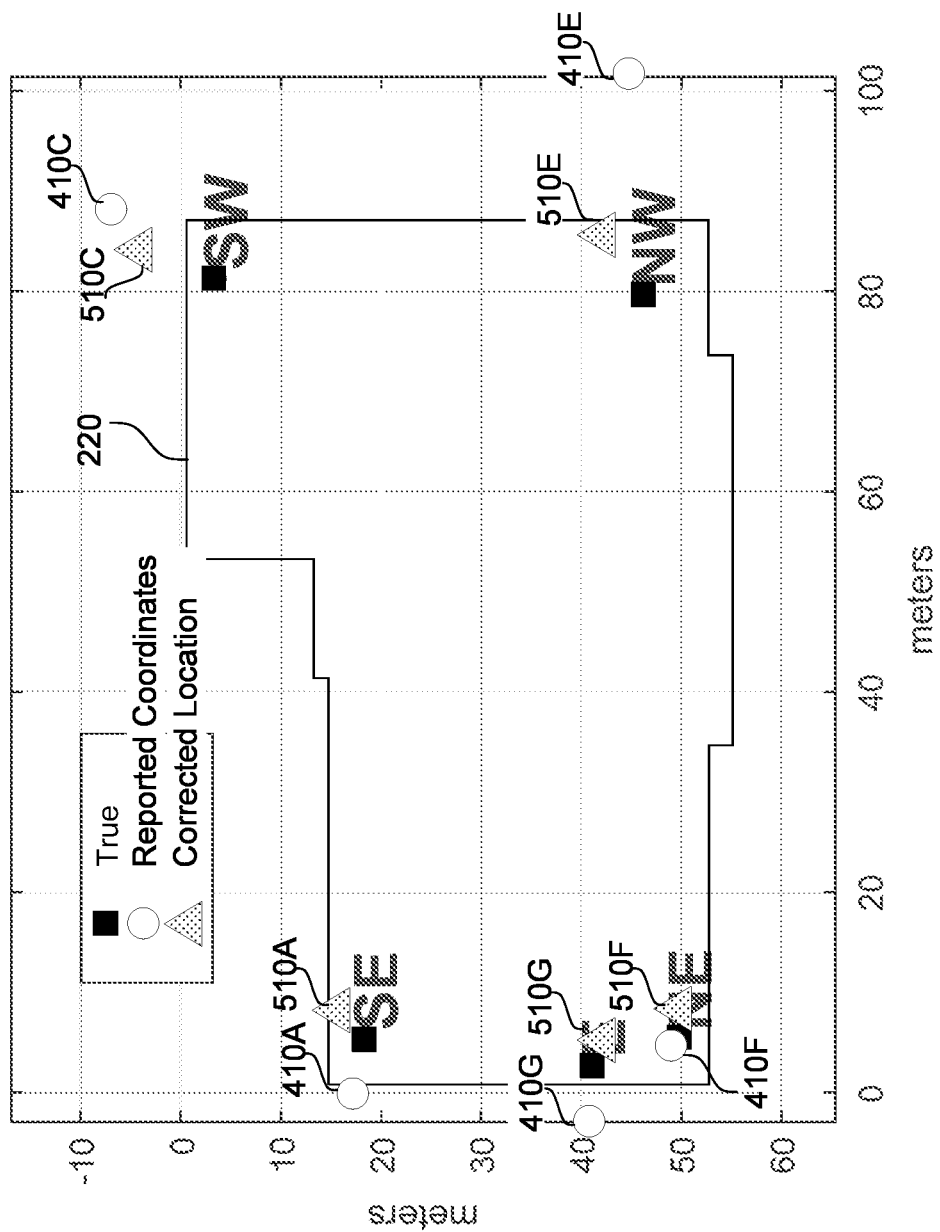
FIG. 5 illustrates true spatial locations, incorrect reported geolocations, and improved calculated locations of network devices plotted on a floor map after step (2), in accordance with some examples of the application.

An illustrative example of block 120 is provided with FIG. 5. In this example, the "S" network device illustrated as second AP 210B and second reported coordinate 410B (e.g., located in the south portion of structure 220 of FIG. 4) had the least accurate or "worst" locations between the GPS raw value and the true value. The data correction process may identify second AP 210B and second reported coordinate 410B and remove it from further computations.

In some examples, more than one AP may be removed. For example, the data correction process may identify second AP 210B and second reported coordinate 410B, as well as fourth AP 210D and fourth reported coordinate 410D, and remove them both from further computations.

Once second AP 210B and second reported coordinate 410B are removed (and/or additional APs/reported coordinates), the process may repeat block 110 to calculate and improve the accuracy of device location from reported coordinates and device-to-device measurements. For example, block 110 may be repeated on the remaining devices without second AP 210B to determine the collaborative location calculation and correction values.

As shown in FIG. 5, second AP 210B and second reported coordinate 410B, as well as fourth AP 210D and fourth reported coordinate 410D, are removed from the plotted locations. The process repeats block 110 to calculate and improve the accuracy of device location from reported coordinates and device-to-device measurements. The corrected locations 510 (illustrated as first corrected location 510A, third corrected location 510C, fifth corrected location 510E, sixth corrected location 510F, and seventh corrected location 510G) are identified.

At block 130, the process may repeat block 110 but replace the set of reported coordinates with the corrected locations. For example, as described herein, the corrected locations are adjusted to match the device-to-device range measurements. This can yield a set of non-linear equations representing Euclidean distances between the adjusted locations. The corrected locations may be stored as coordinates on an X- and Y-axis, including $(x_i, y_i)$. The non-linear equations can include unknown values that compare the reported location with the actual location, or the delta/difference between the two locations $(\Delta x_i, \Delta y_i)$ for each device. The unknown values can represent the adjustment needed to match the device-to-device range measurements (e.g., using the device-to-device range measurements discussed with FIG. 3) and the distances obtained from the corrected locations. The formulas described with block 110 may be repeated herein.

The devices may be chosen in an order starting with the largest deviation between the set of coordinates and the corrected location from block 120. In this example, the largest deviation is the "NW" network device, corresponding with fifth AP 210E, fifth reported coordinate 410E, and fifth corrected location 510E. The next device is chosen in decreasing order of magnitude of deviation between set of coordinates and the corrected locations, corresponding with third AP 210C, third reported coordinate 410C, and third corrected location 510C. The corrected geolocations may be reduced from 9.7 meters to 4.1 meters in this example.

In some examples, a single moment in time is used in the computation rather than an average of reported locations during a time range. In some examples, the output of blocks 120 or 130 may be taken for one particular device rather than a group of devices. In some examples, the reported location of AP 210 is based on an individual moment in time. This can be repeated for every sample in the time history. In some examples, a time averaging window may be used. These reduced processing steps can also reduce computation overhead.

Rather than a single moment in time (e.g., the reported GNSS coordinates of the device), a time averaging process corresponding with reported locations can be used to further improve the calculated location of each device, as illustrated with block 140. For example, the process at block 140 may initially identify the network device with the largest deviation, which corresponds with "NW" network device, corresponding with fifth AP 210E, fifth reported coordinate 410E (e.g., the average of a time period), and fifth corrected location 510E, and implement a time averaging process. The time averaging process may replace the instantaneous reported coordinates of the device with reported coordinates over a timeframe of the device (e.g., which represents an average over a predetermined time period, like 24-hours).

Figure 6:
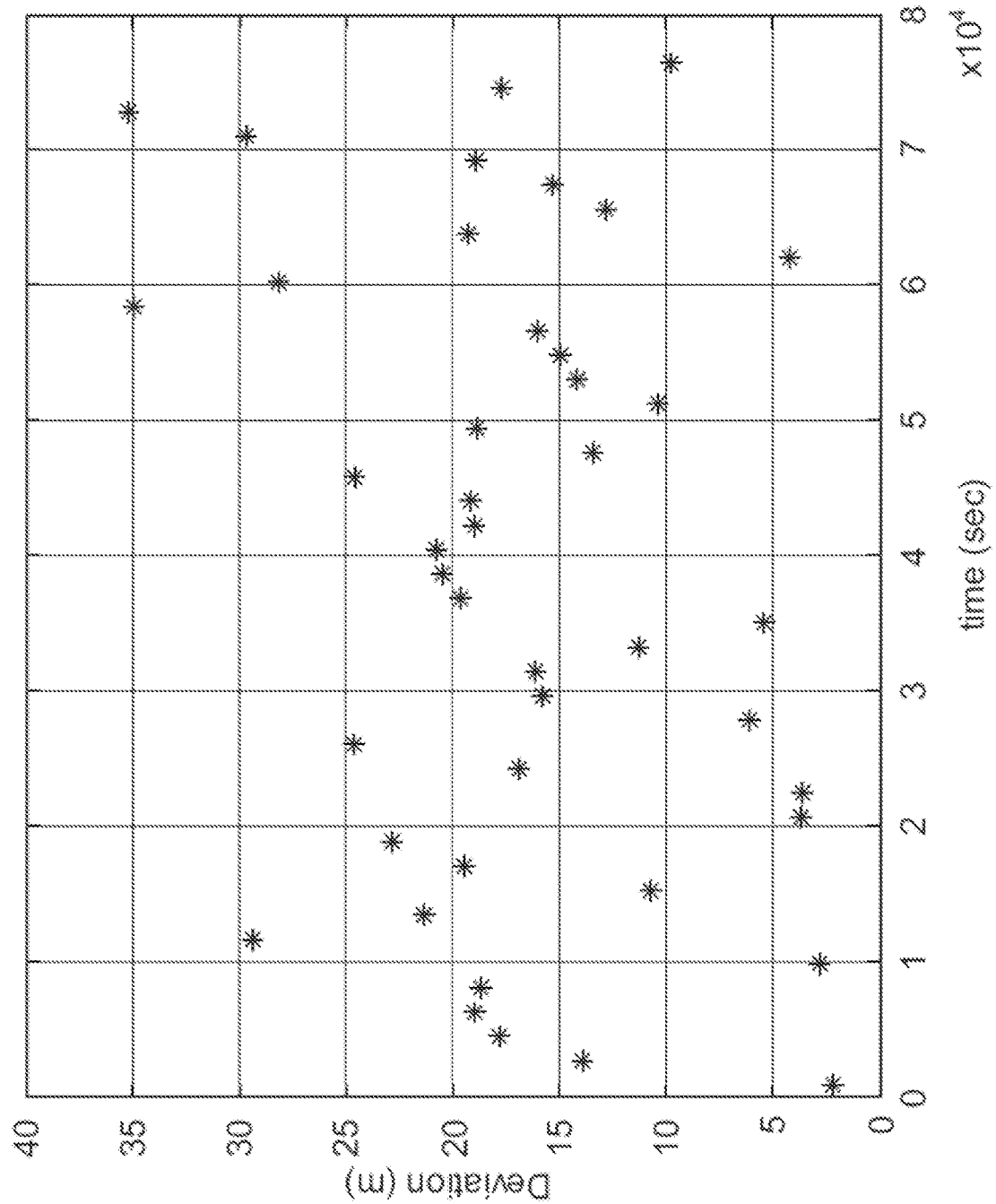
FIG. 6 illustrates difference between reported locations and calculated locations of a single network device over a time period, in accordance with some examples of the application.

FIG. 6 illustrates the use of an average amount of data (e.g., using 30 minutes of data), and plots the deviation between the output after reapplying the data comparison and correction process of block 110 for fifth AP 210E and the reported coordinates for fifth AP 210E at each time sample. In this example, the position corresponding to the minimum deviation is selected and may replace the reported coordinates (e.g., from GNSS/GPS) at block 120 or 130. The process may then rerun block 110 using the new corrected location from a point in time or a time average.

In some examples, block 140 may be performed on the network device having the largest deviation between the corrected location from block 130 and the initial set of reported coordinates prior to implementing block 110. In some examples, block 140 may be performed for each device in decreasing order of the deviation after the first network device. In this example, the mean error corresponding with the corrected geolocations after block 140 may be reduced from 4.1 meters to 3.1 meters.

The locations may further be improved using a geographical representation of locations of the devices in the environment within structure 220. For example, in block 150, if building boundaries, a floor map, or other geographical representation of locations of the devices in the environment is available, boundary information from the map may be used to further reduce the error between the improved calculated locations of devices and the true spatial locations of the devices. The spatial locations of the network devices may be compared with known boundaries of a structure (e.g., structure 220). If any determined location of a particular network device is located outside the boundaries of the structure, the determined location may be moved to exist within the boundaries of the structure. This may include, for example, projecting the corrected location to the nearest wall of the structure. The corrected geolocations may be reduced from the original error value of 20.8 meters to 2.5 meters in this example.

In some examples, the floor map may also include ceiling or floor heights of structure 220. These values may be used to estimate the z-value of the network devices in the environment. The spatial locations of the network devices may be compared with known floor/ceiling boundaries of structure 220 during block 150 as well.

Figure 7:
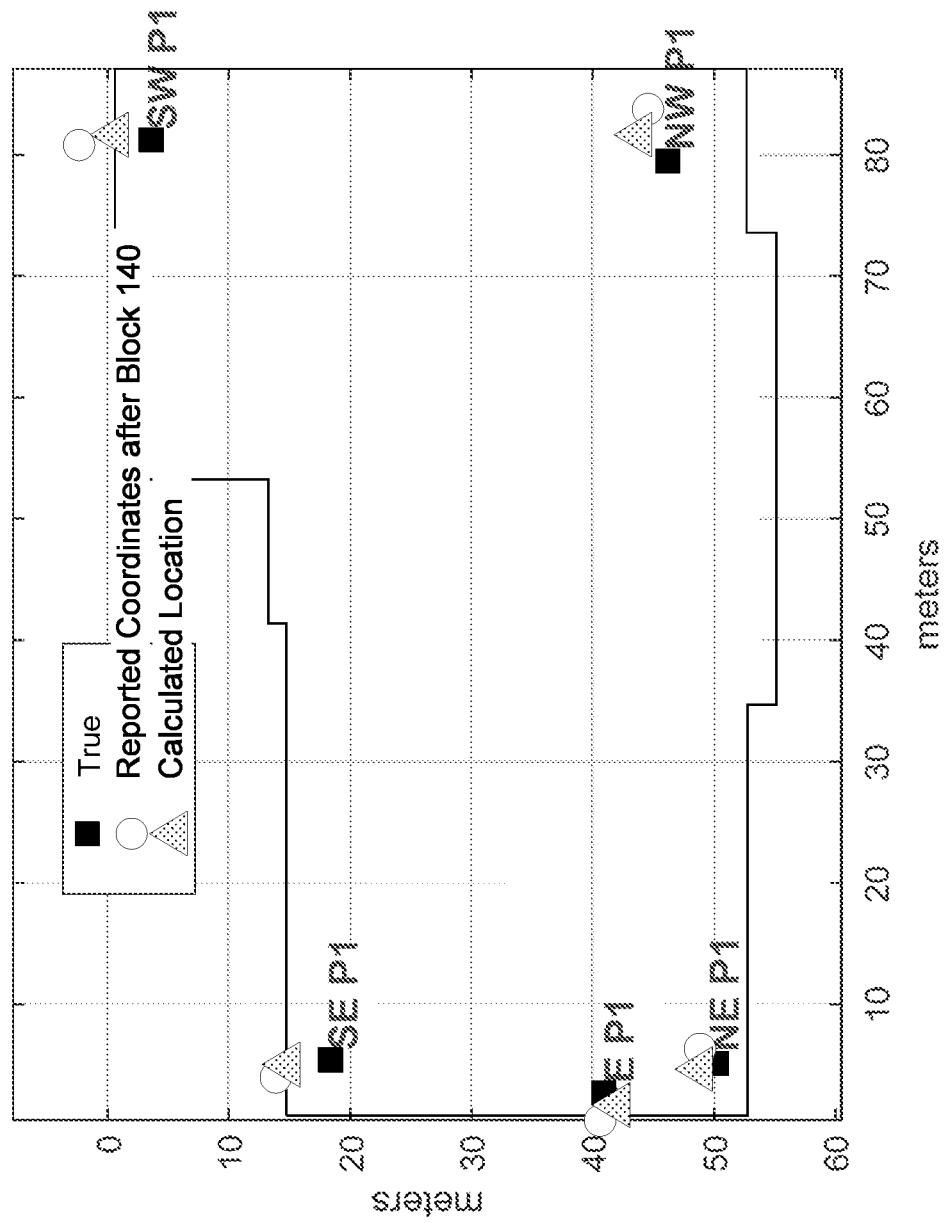
FIG. 7 illustrates true spatial locations, calculated locations after step (4), and calculated location of network devices after step (4) and subsequently applying step (1) plotted on a floor map, in accordance with some examples of the application.

FIG. 7 illustrates true spatial locations, the reported locations based on the small time average corresponding to the minimum deviation as described in block 140, and calculated location of network devices after block 150 plotted on a geographical boundary representation of the structure, in accordance with some examples of the application. As shown by comparing the true locations and calculated locations in FIG. 7 with the true locations and reported locations in FIG. 4, the process provides multiple methods for improving the location determination of each of the devices illustrated in these examples. These processes create better location accuracy of the devices within the structure and improve the data used throughout the system.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

Figure 8:
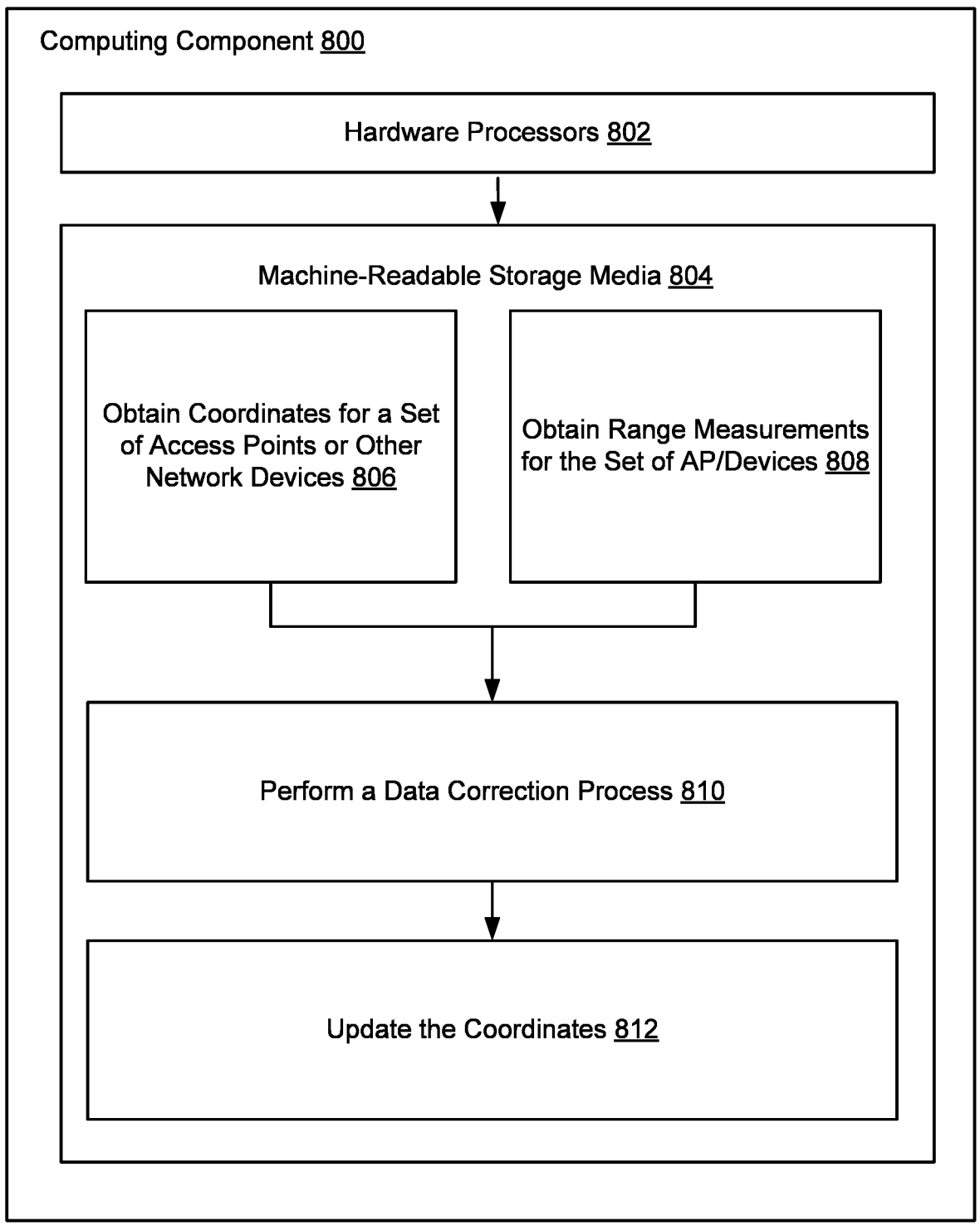
FIG. 8 is an example computing component that may be used to implement various features of examples described in the present disclosure.

FIG. 8 illustrates an example computing component that may be used to implement location detection in accordance with various examples. Referring now to FIG. 8, computing component 800 may be, for example, a server computer, a controller, or any other similar computing component capable of processing data. In the example implementation of FIG. 8, the computing component 800 includes a hardware processor 802, and machine-readable storage medium for 804.

Hardware processor 802 may be one or more central processing units (CPUs), semiconductor-based microprocessors, and/or other hardware devices suitable for retrieval and execution of instructions stored in machine-readable storage medium 804. Hardware processor 802 may fetch, decode, and execute instructions, such as instructions 806-812, to control processes or operations for location detection. As an alternative or in addition to retrieving and executing instructions, hardware processor 802 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 804, may be any electronic, magnetic, optical, or other physical storage device that contains or stores executable instructions. Thus, machine-readable storage medium 804 may be, for example, Random Access Memory (RAM), non-volatile RAM (NVRAM), an Electrically Erasable Programmable Read-Only Memory (EEPROM), a storage device, an optical disc, and the like. In some examples, machine-readable storage medium 804 may be a non-transitory storage medium, where the term "non-transitory" does not encompass transitory propagating signals. As described in detail below, machine-readable storage medium 804 may be encoded with executable instructions, for example, instructions 806-812.

Hardware processor 802 may execute instruction 806 to obtain coordinates for a set of access points or other network devices and, in some examples, may also calculate a distance between the devices. For example, one or more access points 210 may obtain a set of global navigation satellite systems (GNSS) or global positioning system (GPS) coordinates and calculate a distance between the network devices representing a first set of range measurements calculated for a set of network devices (e.g., APs).

Hardware processor 802 may execute instruction 808 to obtain range measurements for the set of access points. For example, one or more access points 210 may obtain a second set of device-to-device range measurements for the set of network devices.

In some examples, instructions 806 and 808 may be performed simultaneously or in parallel.

Hardware processor 802 may execute instruction 810 to perform a data correction process. For example, one or more access points 210 may perform a data correction process by matching the first set of range measurements and the second set of device-to-device range measurements or other device range measurements. In some examples, one or more access points 210 may determine a set of deviations between a range computed from the set of coordinates and the second set of range measurements.

In some examples, hardware processor 802 may execute instructions corresponding with the block illustrated in FIG. 1. For example, hardware processor 802 may execute an instruction to calculate and improve accuracy of device location from reported coordinates (e.g., using Earth as a frame of reference, or selected from a set of latitude, longitude, altitude, Cartesian x, y, or z values, polar coordinates, etc.) and device-to-device measurements, execute an instruction to discard a least accurate (i.e. worst) reported coordinates, execute an instruction to update the locations with improved calculated locations, execute an instruction to use GNSS/GPS time history data to improve accuracy of device location, and execute an instruction to correct locations based on a floor map.

Hardware processor 802 may execute instruction 812 to update the coordinates. For example, one or more access points 210 or other network devices may update the set of coordinates by adjusting the set of coordinates based on the set of deviations.

Figure 9:
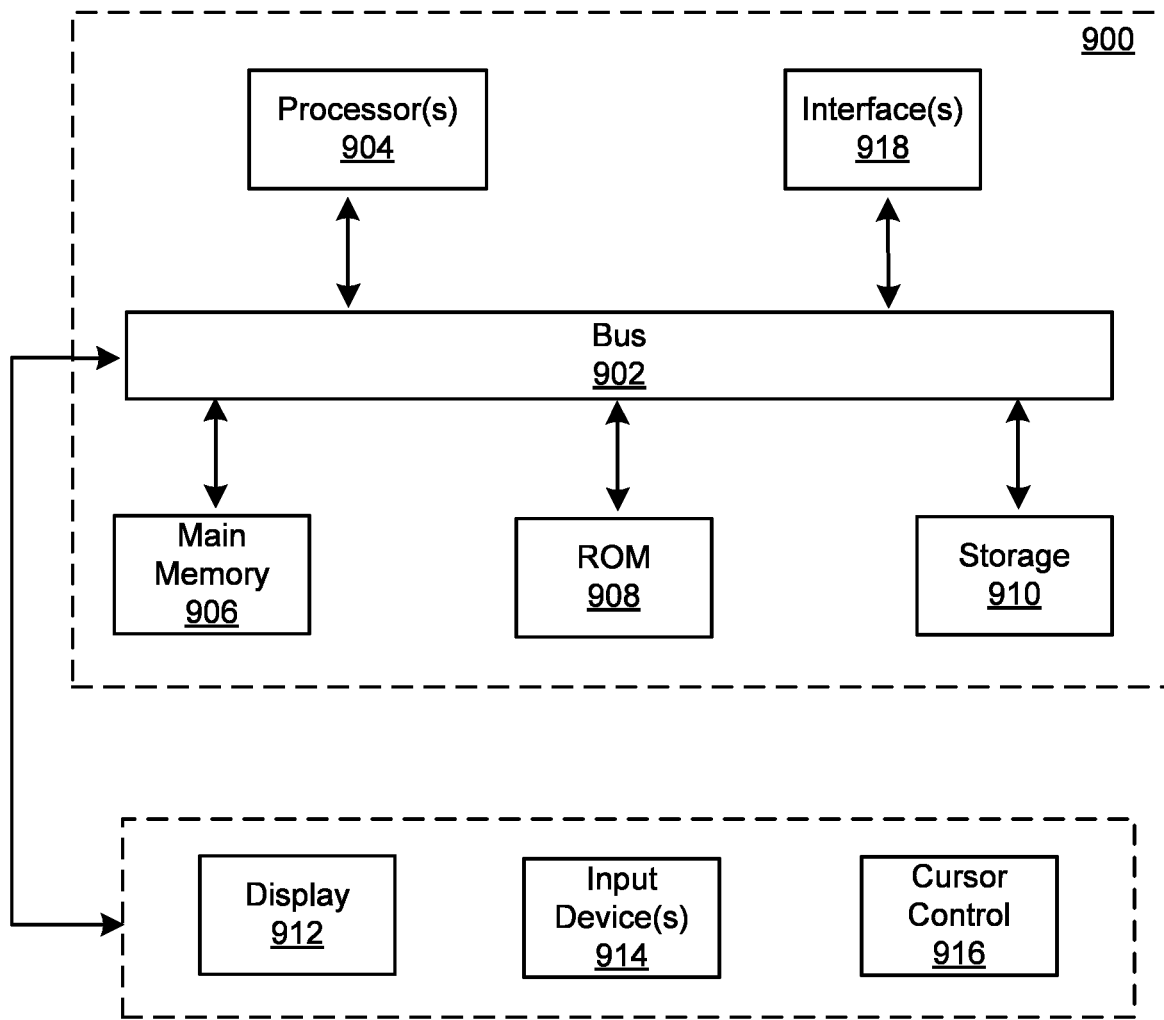
FIG. 9 depicts a block diagram of an example computer system in which various of the examples described herein may be implemented.

FIG. 9 depicts a block diagram of an example computer system 900 in which various of the examples described herein may be implemented. The computer system 900 includes a bus 902 or other communication mechanism for communicating information, one or more hardware processors 904 coupled with bus 902 for processing information. Hardware processor(s) 904 may be, for example, one or more general purpose microprocessors.

The computer system 900 also includes a main memory 906, such as a random access memory (RAM), cache and/or other dynamic storage devices, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions.

The computer system 900 further includes a read only memory (ROM) 908 or other static storage device coupled to bus 902 for storing static information and instructions for processor 904. A storage device 910, such as a magnetic disk, optical disk, or USB thumb drive (Flash drive), is provided and coupled to bus 902 for storing information and instructions.

The computer system 900 may be coupled via bus 902 to a display 912, such as a liquid crystal display (LCD) (or touch screen), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. In some examples, the same direction information and command selections as cursor control may be implemented via receiving touches on a touch screen without a cursor.

The computing system 900 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 900 may implement the techniques described herein using customized hard-wired logic, one or more ASICs or FPGAs, firmware and/or program logic which in combination with the computer system causes or programs computer system 900 to be a special-purpose machine. According to one example, the techniques herein are performed by computer system 900 in response to processor(s) 904 executing one or more sequences of one or more instructions contained in main memory 906. Such instructions may be read into main memory 906 from another storage medium, such as storage device 910. Execution of the sequences of instructions contained in main memory 906 causes processor(s) 904 to perform the process steps described herein. In alternative examples, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 910. Volatile media includes dynamic memory, such as main memory 906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 902. Transmission media can also take the form of acoustic or light waves, such as those generated during radio-wave and infra-red data communications.

The computer system 900 also includes a communication interface 918 coupled to bus 902. Communication interface 918 provides a two-way data communication coupling to one or more network links that are connected to one or more local networks. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN (or WAN component to communicated with a WAN). Wireless links may also be implemented. In any such implementation, communication interface 918 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 918, which carry the digital data to and from computer system 900, are example forms of transmission media.

The computer system 900 can send messages and receive data, including program code, through the network(s), network link and communication interface 918. In the Internet example, a server might transmit a requested code for an application program through the Internet, the ISP, the local network and the communication interface 918.

The received code may be executed by processor 904 as it is received, and/or stored in storage device 910, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed examples. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAS, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 900.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain examples include, while other examples do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method comprising:
   obtaining a set of coordinates, wherein the set of coordinates are provided using Earth as a frame of reference;
   calculating a distance between APs representing a first set of range measurements calculated for a set of access points (APs);
   obtaining a second set of AP-to-AP range measurements for the set of APs;
   and
   performing a data correction process by matching the first set of range measurements and the second set of AP-to-AP range measurements, the data correction process comprising:
      determining a set of deviations between a range computed from the set of coordinates and the second set of AP-to-AP range measurements; and
      updating the set of coordinates by adjusting the set of coordinates based on the set of deviations,
      wherein the data correction process reduces deviations between the set of coordinates and the second set of AP-to-AP range measurements,
      wherein the updated set of coordinates is associated with determined physical locations of the set of APs, and
      wherein the data correction process determines the updated set of coordinates when transmission signals are obstructed by physical barriers or building boundaries.

2. The method of claim 1, wherein a quality of wireless transmissions from a global navigation satellite system (GNSS) to a first AP and a second AP in the set of APs is degraded.

3. The method of claim 1, further comprising:
   upon performing the data correction process, discarding a least accurate reported global positioning system (GPS) location from the set of coordinates.

4. The method of claim 1, further comprising:
   upon performing the data correction process, calculating a set of improved calculated locations from the set of coordinates; and
   replacing the set of coordinates with the improved calculated locations.

5. The method of claim 1, further comprising:
   using global navigation satellite system (GNSS) history to generate improved calculated locations from the updated set of coordinates.

6. The method of claim 1, further comprising:
   receiving a floor map; and
   upon performing the data correction process, updating the updated set of coordinates using the floor map.

7. A non-transitory computer-readable storage medium storing a plurality of instructions executable by one or more processors, the plurality of instructions when executed by the one or more processors cause the one or more processors to:
   obtain a set of coordinates, wherein the set of coordinates are provided using Earth as a frame of reference;
   calculate a distance between network devices representing a first set of device-to-device range measurements calculated for a set of network devices;
   obtain a second set of device-to-device range measurements for the set of network devices;
   and
   perform a data correction process by matching the first set of device-to-device range measurements and the second set of device-to-device range measurements, the data correction process comprising:
      determining a set of deviations between a range computed from the set of coordinates and the second set of device-to-device range measurements; and
      updating the set of coordinates by adjusting the set of coordinates based on the set of deviations,
      wherein the data correction process reduces deviations between the set of coordinates and the second set of device-to-device range measurements,
      wherein the updated set of coordinates is associated with determined physical locations of the set of network devices, and
      wherein the data correction process determines the updated set of coordinates when transmission signals are obstructed by physical barriers or building boundaries.

8. The computer-readable storage medium of claim 7, wherein the second set of device-to-device range measurements correspond with a first network device and a second network device in the set of network devices.

9. The computer-readable storage medium of claim 7, wherein a quality of wireless transmissions from a global navigation satellite system (GNSS) to a first device and a second device in the set of network devices is degraded.

10. The computer-readable storage medium of claim 7, the one or more processors further to:
   upon performing the data correction process, discard a least accurate reported global navigation satellite system (GNSS) location from the set of coordinates.

11. The computer-readable storage medium of claim 7, the one or more processors further to:
  upon performing the data correction process, calculate a set of improved calculated locations from the set of coordinates; and
  replace the set of coordinates with the improved calculated locations.

12. The computer-readable storage medium of claim 7, the one or more processors further to:
  use global navigation satellite system (GNSS) history to generate improved calculated locations from the updated set of coordinates.

13. The computer-readable storage medium of claim 7, the one or more processors further to:
  receive a floor map; and
  upon performing the data correction process, update the updated set of coordinates using the floor map.

14. A computer system comprising:
  a memory; and
  one or more processors that are configured to execute machine readable instructions stored in the memory for performing a method comprising:
    obtaining a set of coordinates of a set of network devices, wherein the set of coordinates are provided using Earth as a frame of reference;
    calculating a distance between the set of network devices representing a first set of range measurements;
    obtaining a second set of range measurements for the set of network devices; and
    performing a data correction process by matching the first set of range measurements and the second set of range measurements, the data correction process comprising:
      determining a set of deviations between a range computed from the set of coordinates and the second set of range measurements; and
      updating the set of coordinates by adjusting the set of coordinates based on the set of deviations,
    wherein the data correction process reduces deviations between the set of coordinates and the second set of range measurements,
    wherein the updated set of coordinates is associated with determined physical locations of the set of network devices, and
    wherein the data correction process determines the updated set of coordinates when transmission signals are obstructed by physical barriers or building boundaries.

15. The computer system of claim 14, wherein the second set of range measurements is measured based on device-to-device measurements, and the second set of range measurements correspond with a first network device and a second network device in the set of network devices.

16. The computer system of claim 14, wherein a quality of wireless transmissions from a global navigation satellite system (GNSS) to a first network device and a second network device in the set of network devices is degraded.

17. The computer system of claim 14, the method further comprising:
  upon performing the data correction process, discarding a least accurate reported location from the set of coordinates.

18. The computer system of claim 17, the method further comprising:
  upon performing the data correction process, calculating a set of improved calculated locations from the set of coordinates; and
  replacing the set of coordinates with the improved calculated locations.

19. The computer system of claim 14, the method further comprising:
  using a global navigation satellite system (GNSS) history to generate improved calculated locations from the updated set of coordinates.

20. The computer system of claim 14, the method further comprising:
  receiving a floor map; and
  upon performing the data correction process, updating the updated set of coordinates using the floor map.

* * * * *